US012627015B2

(12) United States Patent
Zhou et al.

(10) Patent No.: US 12,627,015 B2
(45) Date of Patent: May 12, 2026

(54) BATTERY CELL HAVING A PROTECTIVE MEMBER, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Liangfan Xu, Ningde (CN); Quankun Li, Ningde (CN); Xing Li, Ningde (CN); Peng Wang, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/226,446

(22) Filed: Jun. 3, 2025

(65) Prior Publication Data

US 2025/0293416 A1    Sep. 18, 2025

Related U.S. Application Data

(63) Continuation of application No. PCT/CN2023/127508, filed on Oct. 20, 2023.

(30) Foreign Application Priority Data

Mar. 17, 2023    (CN) .......................... 202310265348.2

(51) Int. Cl.
*H01M 50/591*        (2021.01)
*H01M 50/103*        (2021.01)
(Continued)

(52) U.S. Cl.
CPC ....... *H01M 50/591* (2021.01); *H01M 50/103* (2021.01); *H01M 50/15* (2021.01);
(Continued)

(58) Field of Classification Search
CPC ............. H01M 50/591; H01M 50/103; H01M 50/588; H01M 50/15; H01M 50/682
See application file for complete search history.

(56) References Cited

U.S. PATENT DOCUMENTS

2021/0057693 A1*  2/2021  Karitani ............. H01M 50/583
2022/0336913 A1   10/2022  Gu et al.

FOREIGN PATENT DOCUMENTS

CN        109564997 A   *  4/2019  ........... H01M 50/15
CN        110767848 A   *  2/2020  ........ H01M 10/0587
(Continued)

OTHER PUBLICATIONS

CN 112736338 English Translation (Year: 2021).*
(Continued)

*Primary Examiner* — Jimmy Vo
(74) *Attorney, Agent, or Firm* — Ladas & Parry, LLP

(57)        ABSTRACT

A battery cell, a battery, and a power consuming device are described. The battery cell includes a housing, an electrode terminal, and a protective member. The housing includes a first end wall, the electrode terminal is disposed on the first end wall, the protective member covers an outer surface of the first end wall, a first through hole is provided on the protective member, and the first through hole is configured to expose the electrode terminal. A cavity configured to store liquid is formed between the protective member and the first end wall. The battery cell has relatively high reliability.

20 Claims, 5 Drawing Sheets

(51) Int. Cl.
    *H01M 50/15*     (2021.01)
    *H01M 50/588*     (2021.01)
    *H01M 50/682*     (2021.01)

(52) U.S. Cl.
    CPC ....... *H01M 50/588* (2021.01); *H01M 50/682*
        (2021.01); *H01M 2220/20* (2013.01)

(56)           References Cited

FOREIGN PATENT DOCUMENTS

| | | | | |
|---|---|---|---|---|
| CN | 112736338 A * | 4/2021 | ........ | H01M 10/0525 |
| CN | 112751114 A | 5/2021 | | |
| CN | 216903260 U | 7/2022 | | |
| CN | 217009510 U | 7/2022 | | |
| CN | 217788566 U | 11/2022 | | |
| EP | 4546519 A1 * | 4/2025 | .......... | H01M 50/148 |
| JP | 2022118379 A | 8/2022 | | |
| WO | WO-2018026852 A1 * | 2/2018 | .......... | H01M 50/572 |

OTHER PUBLICATIONS

CN 110767848 English Translation (Year: 2020).*
EP 4546519 English Translation (Year: 2022).*
CN_109564997 Translation (Year: 2019).*
WO_2018026852 Translation (Year: 2018).*
ISR for PCT/CN2023/125708 dated Jan. 11, 2024.
Written Opinion PCT/CN2023/125708 dated Jan. 11, 2024.
Extended European search report from corresponding European Patent Application No. 23928325.2 dated Mar. 3, 2026.

* cited by examiner

1000

100

BATTERY CELL HAVING A PROTECTIVE MEMBER, BATTERY, AND POWER CONSUMING DEVICE

CROSS-REFERENCE TO RELATED APPLICATIONS

This application is a continuation of International application PCT/CN2023/127508 filed on Oct. 20, 2023 that claims priority to Chinese Patent Application No. CN202310265348.2, filed on Mar. 17, 2023. The content of these applications is incorporated herein by reference in its entirety.

TECHNICAL FIELD

This application relates to the field of battery technologies, and specifically, to a battery cell, a battery, and a power consuming device.

BACKGROUND

Energy conservation and emission reduction are keys to the sustainable development of the automobile industry. Electric vehicles become an important part of the sustainable development of the automobile industry due to their advantages of energy conservation and environmental protection. For the electric vehicles, a battery technology is also an important factor related to the development of the electric vehicles.

During manufacturing of a battery, the reliability of the battery is an issue that cannot be ignored. Therefore, how to improve the reliability of the battery is a technical problem that needs to be urgently resolved in the battery technology.

SUMMARY

This application provides a battery cell, a battery, and a power consuming device. The battery cell has relatively high reliability.

This application is implemented through the following technical solutions.

According to a first aspect, an embodiment of this application provides a battery cell. The battery cell includes a housing, an electrode terminal, and a protective member. The housing includes a first end wall, the electrode terminal is disposed on the first end wall, the protective member covers an outer surface of the first end wall, a first through hole is provided on the protective member, and the first through hole is configured to expose the electrode terminal. A cavity configured to store liquid is formed between the protective member and the first end wall.

According to the battery cell in the embodiments of this application, the protective member is disposed on the outer surface of the first end wall, and the cavity configured to store the liquid is formed between the protective member and the first end wall, so that a space for storing the liquid between the protective member and the first end wall can be increased. The protective member can cooperate with the first end wall to constrain the liquid leaking from the first end wall. When the liquid leaks from the first end wall, more liquid can be stored between the protective member and the first end wall, to slow down liquid dropping and reduce a risk of a short circuit caused by contact between a positive electrode and a negative electrode that is caused by liquid splashing. In this way, the battery cell has relatively high reliability.

According to some embodiments of this application, the cavity is provided around the electrode terminal.

In the foregoing solution, the cavity is provided around the electrode terminal, so that the liquid can be stored on a periphery of the electrode terminal, which has a relatively good constraining effect on the liquid, and can slow down flow of the liquid toward the electrode terminal.

According to some embodiments of this application, the battery cell further includes an insulating member, and the insulating member is disposed between the electrode terminal and the first end wall; and a part of the protective member that surrounds the first through hole and the first end wall or the insulating member are connected to form a first connection portion, the first connection portion is disposed around the electrode terminal, and the cavity is separated from the first connection portion.

In the foregoing solution, the part of the protective member that surrounds the first through hole is connected to the first end wall or the insulating member, and the cavity is separated from the first connection portion, so that the flow of the liquid toward the first connection portion can be slowed down, and failure of the first connection portion can be slowed down.

According to some embodiments of this application, a protrusion is formed on the outer surface of the first end wall, the protective member covers the protrusion, and the cavity includes a first sub-cavity located on a peripheral side of the protrusion.

In the foregoing embodiment, the protective member covers the protrusion, and the first sub-cavity can be formed on the peripheral side of the protrusion by using a structure of the protrusion, to store more liquid.

According to some embodiments of this application, the protrusion is disposed around the electrode terminal, the protrusion has a first end surface facing away from inside of the housing, an inner peripheral surface facing the electrode terminal, and an outer peripheral surface facing away from the electrode terminal, and the protective member is attached to the first end surface; and the protective member is not attached to the inner peripheral surface, to form the first sub-cavity between the protective member and the inner peripheral surface; and/or the protective member is not attached to the outer peripheral surface, to form the first sub-cavity between the protective member and the outer peripheral surface.

In the foregoing embodiment, the protrusion is disposed around the electrode terminal, and the first sub-cavity is located on a side of the protrusion that faces the electrode terminal and/or a side that faces away from the electrode terminal, to form blocking on the periphery of the electrode terminal, and slow down the flow of the liquid between the protective member and the first end wall toward the electrode terminal, thereby reducing a risk of a short circuit caused by contact between the liquid and the electrode terminal.

According to some embodiments of this application, the first sub-cavity is provided around the electrode terminal, and a cross section of the first sub-cavity is in a shape of a triangle.

In the foregoing embodiment, the first sub-cavity is provided on the periphery of the electrode terminal, and the cross section of the first sub-cavity is in the shape of a triangle, so that more liquid can be stored in the first sub-cavity, which has a good constraining effect on the liquid, and further slows down the flow of the liquid toward the electrode terminal.

According to some embodiments of this application, the electrode terminal has a second end surface facing away from inside of the housing, and the protrusion does not extend out of the second end surface along a thickness direction of the first end wall.

In the foregoing embodiment, the protrusion does not extend out of the second end surface along the thickness direction of the first end wall, so that the second end surface is connected to another component, facilitating input or output of electric energy.

According to some embodiments of this application, the first end wall includes a body and a protruding portion, the body is disposed around the protruding portion, the body includes a first surface facing away from inside of the housing, the protruding portion protrudes from the first surface, the electrode terminal is disposed on the protruding portion, and the cavity includes a second sub-cavity located at a joint between the protruding portion and the body.

In the foregoing embodiment, the electrode terminal is disposed on the protruding portion, to facilitate a connection between the electrode terminal and the another component (such as a bus component). The second sub-cavity is formed at the joint between the protruding portion and the body, to store liquid by using a structure of the protruding portion.

According to some embodiments of this application, the second sub-cavity is provided around the protruding portion.

In the foregoing embodiment, the second sub-cavity is provided around the protruding portion, and the second sub-cavity has a relatively large space for storing the liquid, to store more liquid.

According to some embodiments of this application, the protruding portion includes a first wall portion and a second wall portion, the first wall portion is disposed parallel to the body, the second wall portion is disposed around the first wall portion, the second wall portion connects the first wall portion and the body, the electrode terminal is disposed on the first wall portion, and the second sub-cavity is located at a joint between the second wall portion and the body.

In the foregoing embodiment, the second sub-cavity is located at the joint between the second wall portion and the body, and the electrode terminal is disposed on the first wall portion, which can slow down the flow of the liquid between the protective member and the first end wall toward the electrode terminal, and reduce a risk of a short circuit caused by contact between the liquid and the electrode terminal.

According to some embodiments of this application, a first groove is provided on the outer surface of the first end wall, the electrode terminal is disposed on a groove bottom wall of the first groove, the part of the protective member that surrounds the first through hole is connected to the groove bottom wall of the first groove, and the cavity includes a third sub-cavity located at a joint between the groove bottom wall of the first groove and a groove side wall of the first groove.

In the foregoing embodiment, the electrode terminal is disposed on the groove bottom wall of the first groove, so that a space occupied by the electrode terminal in the thickness direction of the first end wall can be reduced. In addition, a space between the protective member and the joint between the groove bottom wall of the first groove and the groove side wall of the first groove forms the third sub-cavity, so that the space of the first groove is used to form the space for storing the liquid.

According to some embodiments of this application, the third sub-cavity is provided around the electrode terminal, and a cross section of the third sub-cavity is in a shape of a triangle.

In the foregoing embodiment, the third sub-cavity is provided around the electrode terminal, and the cross section of the third sub-cavity is in the shape of a triangle, so that the third sub-cavity has a relatively large space for storing the liquid, to store more liquid.

According to some embodiments of this application, a second groove is provided on the outer surface of the first end wall, the protective member covers the second groove, and the cavity includes a fourth sub-cavity enclosed by the second groove and the protective member.

In the foregoing embodiment, the protective member covers the second groove to form the fourth sub-cavity, so that the space between the protective member and the first end wall is used to store the liquid.

According to some embodiments of this application, the housing further includes a side wall, the side wall is disposed around the first end wall, and the protective member covers at least a part of an outer surface of the side wall.

In the foregoing embodiment, the protective member covers at least a part of the outer surface of the side wall, so that there is a relatively large coverage area between the protective member and the housing, there is relatively high connection stability between the protective member and the housing, and a risk that the protective member falls off an outer surface of the housing is reduced.

According to some embodiments of this application, the first end wall and the side wall are connected to form a second connection portion, and the protective member covers the second connection portion.

In the foregoing solution, the protective member covers the second connection portion, and when the second connection portion is damaged, liquid leaking through the second connection portion can be constrained by the protective member, thereby reducing a risk of a short circuit between a positive electrode and a negative electrode that is caused by liquid splashing.

According to some embodiments of this application, the housing further includes a second end wall, the second end wall is disposed opposite to the first end wall, the side wall connects the first end wall and the second end wall, and the protective member covers at least a part of an outer surface of the second end wall.

In the foregoing embodiment, the protective member covers at least a part of the outer surface of the second end wall, and after covering the first end wall and the side wall, the protective member extends to the second end wall, thereby further increasing the coverage area between the protective member and the housing, and improving connection stability between the protective member and the housing.

According to some embodiments of this application, a part of the outer surface of the second end wall is not covered by the protective member.

In the foregoing embodiment, a part of the outer surface of the second end wall is not covered by the protective member, so that the part of the second end wall that is not covered by the protective member is connected to another component.

According to some embodiments of this application, the protective member is an insulating film.

In the foregoing embodiment, the protective member is an insulating film, so that the housing is electrically insulated from another component, thereby reducing a risk of a short circuit caused by contact between a positive electrode and a negative electrode.

According to a second aspect, an embodiment of this application further provides a battery, including the battery cell according to any of the foregoing embodiments.

According to a third aspect, an embodiment of this application further provides a power consuming device, including the battery cell or the battery according to any of the foregoing embodiments.

The foregoing descriptions are only an overview of the technical solutions of this application. In order to better understand the technical means of this application, it can be practiced in accordance with the content of the descriptions, and in order to make the above and other objectives, features and advantages of this application more comprehensible, specific implementations of this application are particularly listed below.

BRIEF DESCRIPTION OF THE DRAWINGS

In order to more clearly describe the technical solutions of embodiments of this application, the accompanying drawings that need to be used in the embodiments will be described briefly below. It should be understood that the following accompanying drawings illustrate only some embodiments of this application and should therefore not be construed as a limitation on the scope of this application. A person of ordinary skill in the art can also obtain other related accompanying drawings according to these accompanying drawings without any creative effort.

Figure 1:
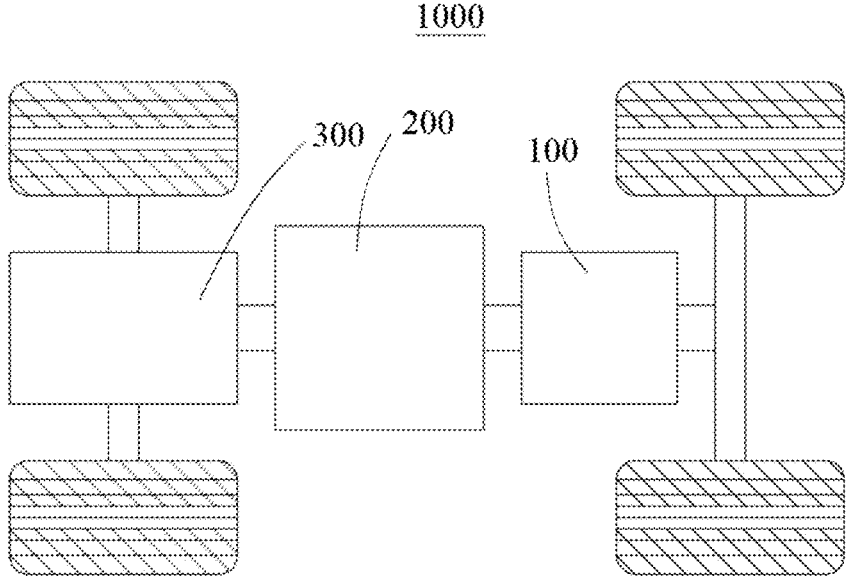
FIG. 1 is a schematic diagram of a structure of a vehicle according to some embodiments of this application.

In the accompanying drawings, the figures are not drawn to actual scale.

List of reference numerals: 100—Battery; 10—box; 11—first sub-box; 12—second sub-box; 20—battery cell; 21—housing; 211—shell; 212—end cap; 213—first end wall; 2131—protrusion; 2131*a*—first end surface; 2131*b*—inner peripheral surface; 2131*c*—outer peripheral surface; 2132—body; 2133—protruding portion; 2133*a*—first wall portion; 2133*b*—second wall portion; 2134—first surface; 2135—second surface; 2136—first groove; 2136*a*—groove bottom wall; 2136*b*—groove side wall; 2137—first part; 2138—second part; 2139—second groove; 2140—liquid injection hole; 214—side wall; 215—second connection portion; 216—second end wall; 22—electrode terminal;

221—second end surface; 23—protective member; 231—first through hole; 24—electrode assembly; 241—tab; 25—adapting member; 26—adhesive layer; 27—pressure relief mechanism; 28—insulating member; 29—first connection portion; Q—cavity; Q1—first sub-cavity; Q2—second sub-cavity; Q3—third sub-cavity; Q4—fourth sub-cavity; 200—controller; 300—motor; and 1000—vehicle.

DETAILED DESCRIPTION

To make the objectives, technical solutions, and advantages of embodiments of this application clearer, the following clearly and completely describes the technical solutions in the embodiments of this application with reference to the accompanying drawings in the embodiments of this application. Apparently. the described embodiments are merely some rather than all of the embodiments of this application. All other embodiments obtained by a person of ordinary skill in the art based on the embodiments of this application without creative efforts shall fall within the protection scope of this application.

Unless otherwise defined, meanings of all technical and scientific terms used in this application are the same as those commonly understood by a person skilled in the art to which this application belongs; and the terms used in the descriptions of this application are merely for the purpose of describing specific embodiments, but are not intended to limit this application. The terms "comprise" and "have" and any variations thereof in the specification and the claims of this application as well as the descriptions of the accompanying drawings are intended to cover non-exclusive inclusion. The terms "first", "second" and the like in the specification and claims of this application or the above accompanying drawings are used to distinguish different objects, rather than to describe a specific order or primary-secondary relationship.

"Embodiment" mentioned in this application means that specific features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this application may be combined with other embodiments.

In the descriptions of this application, it should be noted that, unless otherwise expressly specified and limited, the terms "mount", "connect", "connection" and "attachment" should be understood in a broad sense. For example, the connection may be a fixed connection, a detachable connection, or an integral connection; or the connection may be a direct connection, an indirect connection through an intermediate medium, or internal communication between two elements. A person of ordinary skill in the art may understand the specific meanings of the foregoing terms in this application according to specific situations.

The term "and/or" in this application only describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, "a plurality of" means two or more (including two). Similarly, "a plurality of groups" means two or more groups (including two groups), and "a plurality of pieces" means two or more pieces (including two pieces).

In some embodiments, a battery may be a battery module. When there are a plurality of battery cells, the plurality of battery cells are arranged and fixed to form a battery module.

In some embodiments, the battery may be a battery pack. The battery pack includes a box and a battery cell, and the battery cell or the battery module is accommodated in the box.

In some embodiments, the box may be used as a part of a chassis structure of a vehicle. For example, a part of the box may become at least a part of the chassis of the vehicle, or a part of the box may become at least a part of a cross beam and a longitudinal beam of the vehicle.

In some embodiments, the battery may be an energy storage apparatus. The energy storage apparatus includes an energy storage container, an energy storage electric cabinet, or the like.

In the embodiments of this application, the battery cell may be a secondary battery. The secondary battery refers to a battery cell that can be recharged to activate active materials for continuous use after the battery cell is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel hydrogen battery, a nickel cadmium battery, a lead storage battery, or the like. This is not limited in the embodiments of this application.

The battery cell generally includes an electrode assembly. The electrode assembly includes a positive electrode, a negative electrode, and an isolating member. During charging and discharging of the battery cell, active ions (for example, lithium ions) are intercalated and deintercalated back and forth between the positive electrode and the negative electrode. The isolating member is disposed between the positive electrode and the negative electrode, and may serve to prevent a short circuit between the positive electrode and the negative electrode while allowing the active ions to pass through.

In some embodiments, the positive electrode may be a positive electrode plate, and the positive electrode plate may include a positive electrode current collector and a positive electrode active material disposed on at least one surface of the positive electrode current collector.

By way of example, the positive electrode current collector has two surfaces opposite to each other in a thickness direction of the positive electrode current collector, and the positive electrode active material is disposed on either or both of the two opposite surfaces of the positive electrode current collector.

By way of example, the positive electrode current collector may be a metal foil or a composite current collector. For example, the metal foil may be made of silver-surface-processed aluminum or stainless steel, stainless steel, copper, aluminum, nickel, a carbon electrode, carbon, or titanium. The composite current collector may include a polymer material base layer and a metal layer. The composite current collector may be formed by forming a metal material (such as aluminum, aluminum alloy, nickel, nickel alloy, titanium, titanium alloy, silver, or silver alloy) on a polymer material substrate (such as a substrate of polypropylene, polyethylene terephthalate, polybutylene terephthalate, polystyrene, or polyethylene).

By way of example, the positive electrode active material may include at least one of the following materials: a lithium-containing phosphate, a lithium transition metal oxide, and respective modified compounds thereof. However, this application is not limited to these materials, and other conventional materials that can be used as positive electrode active materials of batteries may also be used.

In some embodiments, the negative electrode may be a negative electrode plate, and the negative electrode plate may include a negative electrode current collector.

By way of example, the negative electrode current collector may be a metal foil or a composite current collector. For example, the metal foil may be made of silver-surface-processed aluminum or stainless steel, stainless steel, copper, aluminum, nickel, a carbon electrode, carbon, or titanium.

In some embodiments, the negative electrode current collector has two opposite surfaces in a thickness direction of the negative electrode current collector, and a negative electrode active material is disposed on either or both of the two opposite surfaces of the negative electrode current collector.

By way of example, the negative electrode active material may be a negative electrode active material used for a battery and well known in the art. By way of example, the negative electrode active material may include at least one of the following materials: artificial graphite, natural graphite, soft carbon, hard carbon, a silicon-based material, a tin-based material, lithium titanate, or the like. The silicon-based material may be selected from at least one of elemental silicon, a silicon-oxygen compound, a silicon-carbon composite, a silicon-nitrogen composite, or silicon alloy. The tin-based material may be selected from at least one of elemental tin, a tin-oxygen compound, or tin alloy. However, this application is not limited to these materials, and other conventional materials that can be used as negative electrode active materials of batteries may also be used. One type of these negative electrode active materials may be used individually, or two or more types of these negative electrode active materials may be used in combination.

In some implementations, the isolating member is a separator. There is no particular limitation on a type of the separator in this application, and any well-known separator with a porous structure that has good chemical stability and mechanical stability may be selected.

By way of example, a main material of the separator may be selected from at least one of glass fiber, non-woven fabric, polyethylene, polypropylene, polyvinylidene fluoride, or ceramic. The separator may be a single-layer film or a multi-layer composite film, which is not particularly limited. When the separator is the multi-layer composite film, a material in each layer may be identical or different, which is not particularly limited. The isolating member may be an independent part located between the positive electrode and the negative electrode, or may be attached to a surface of the positive electrode and a surface of the negative electrode.

In some implementations, the isolating member is a solid-state electrolyte. The solid-state electrolyte is disposed between the positive electrode and the negative electrode, and also serves to transmit ions and isolate the positive electrode from the negative electrode.

In some implementations, the electrode assembly is of a winding structure. The positive electrode plate and the negative electrode plate are wound into winding structures.

In some implementations, the electrode assembly is of a laminated structure.

In some implementations, the battery cell may include a housing. The housing is configured to package components such as the electrode assembly and the electrolyte. The housing may be a steel housing, an aluminum housing, a plastic housing (for example, polypropylene), a composite metal housing (for example, a copper-aluminum composite housing), an aluminum-plastic film, or the like.

In some implementations, the housing includes an end cap and a shell, an opening is provided on the shell, and the end cap closes the opening to form a closed space for accommodating materials such as the electrode assembly and the electrolyte. One or more openings may be provided on the shell. One or more end caps may also be disposed.

In some implementations, at least one electrode terminal is disposed on the housing, and the electrode terminal is electrically connected to a tab of the electrode assembly. The electrode terminal may be directly connected to the tab, or may be indirectly connected to the tab by using an adapting member. The electrode terminal may be disposed on the end cap, or may be disposed on the shell.

In some implementations, an explosion-proof valve is disposed on the housing. The explosion-proof valve is configured to release internal pressure of the battery cell.

By way of example, the battery cell may be a cylindrical battery cell, a prismatic battery cell, a soft packet battery cell, or a battery cell in another shape. The prismatic battery cell includes a square-shell battery cell, a blade-shaped battery cell, or a multi-prismatic battery. The multi-prismatic battery is, for example, a hexadecagonal prismatic battery. This is not specifically limited in the embodiments of this application.

Design factors in many aspects need to be all considered for the development of the battery technology, such as an energy density, a discharge capacity, a charge-discharge rate, and other performance parameters. In addition, the reliability of the battery also needs to be considered.

The battery cell includes a housing and an electrode terminal. The housing includes a first end wall, and the electrode terminal is disposed on the first end wall, to implement output or input of electric energy of the battery cell.

When the battery cell is inverted and used, the electrode terminal is located at a bottom of the battery cell, that is, the first end wall is located at the bottom of the housing. When the bottom of the battery cell is subject to an impact and the battery cell deforms, deformation of the battery cell easily causes damage to the housing or a connection portion between the housing and another component. For example, a joint between the end cap of the housing and the shell may be cracked, or a sealing position of a hole (such as a liquid injection hole, a hole in which the electrode terminal is mounted, or a hole in which a pressure relief mechanism is disposed) provided on the first end wall may be cracked. As a result, an electrolyte solution in the battery cell leaks, and the leaked electrolyte solution easily flows to another conductive component, causing a short circuit caused by contact between the positive electrode and the negative electrode, and further causing safety risks such as fire and explosion. In this way, the reliability of the battery is relatively low.

In view of this, to resolve a problem of relatively low reliability of a battery that is caused by leakage of the electrolyte solution, this application provides a technical solution. The protective member is covered on an outer surface of the first end wall, on which the electrode terminal is disposed, that is of the housing. The cavity configured to store the liquid is formed between the protective member and the first end wall. The space for storing the liquid between the protective member and the first end wall can be increased. The protective member can cooperate with the first end wall to constrain the liquid leaking from the first end wall, thereby reducing the risk of the short circuit caused by contact between the positive electrode and the negative electrode that is caused by liquid splashing. In this way, the battery cell has relatively high reliability.

When such a battery cell is used in a battery or a power consuming device, and in a scenario in which the battery cell is inverted and used, even if the bottom of the battery cell is subject to the impact and the battery cell deforms, because the cavity configured to store the liquid is formed between the protective member and the first end wall, the liquid (such as the electrolyte solution) near the first end wall can be accommodated in the cavity, to slow down liquid dripping and reduce the risk of the short circuit caused by contact between the positive electrode and the negative electrode that is caused by liquid splashing. In this way, the battery cell has relatively high reliability.

The battery cell disclosed in the embodiments of this application may be used in but is not limited to a power consuming device such as a vehicle, a ship, or an aircraft. The battery cell or the battery disclosed in this application may be used to form a power supply system of the power consuming device.

The embodiments of this application provide a power consuming device using a battery as a power supply. The power consuming device may include but is not limited to a mobile phone, a tablet computer, a notebook computer, an electric toy, an electric tool, an electric bicycle, an electric motorcycle, an electric vehicle, a ship, a spacecraft, or the like. The electric toy may include a fixed or mobile electric toy, such as a game console, an electric vehicle toy, an electric ship toy, or an electric airplane toy. The spacecraft may include an airplane, a rocket, a space shuttle, a spaceship, or the like.

For ease of description, the power consuming device being a vehicle 1000 in an embodiment of this application is used as an example to describe the following embodiments.

FIG. 1 is a schematic diagram of a structure of a vehicle according to some embodiments of this application. The vehicle 1000 may be a fuel powered vehicle, a gas powered vehicle, or a new energy vehicle, and the new energy vehicle may be a pure electric vehicle, a hybrid electric vehicle, or an extended-range vehicle. A battery 100 is disposed inside the vehicle 1000, and the battery 100 may be disposed at a bottom, head, or tail of the vehicle 1000. The battery 100 may be configured to supply power to the vehicle 1000. For example, the battery 100 may serve as an operating power supply of the vehicle 1000, and is used in a circuit system of the vehicle 1000. For example, the battery 100 is configured for operating electricity requirements during starting, navigation, and operation of the vehicle 1000.

The vehicle 1000 may further include a controller 200 and a motor 300. The controller 200 is configured to control the battery 100 to supply power to the motor 300, for example, to meet operating electricity requirements during starting, navigation, and traveling of the vehicle 1000.

In some embodiments of this application, the battery 100 may serve not only as an operating power supply of the vehicle 1000, but also as a driving power supply of the vehicle 1000, to alternatively or partially replace fuel or natural gas to provide driving power for the vehicle 1000.

Figure 2:
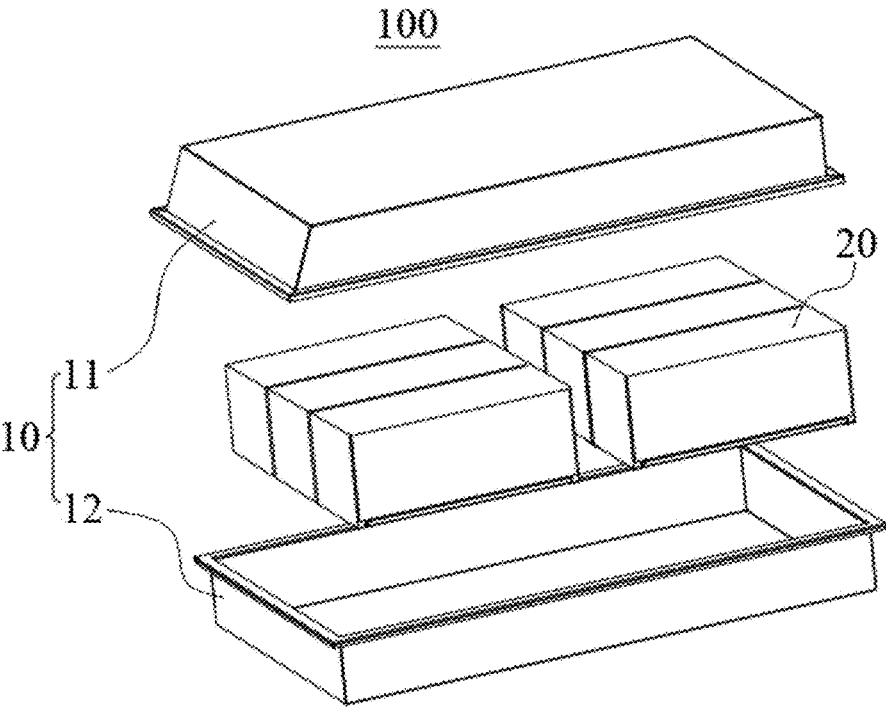
FIG. 2 is an exploded view of a battery according to some embodiments of this application.

FIG. 2 is an exploded view of a battery according to some embodiments of this application. A battery 100 includes a box 10 and a battery cell 20, where the battery cell 20 is accommodated in the box 10. The box 10 is configured to provide an accommodating space for the battery cell 20. The box 10 may use a plurality of structures. In some embodiments, the box 10 may include a first sub-box 11 and a second sub-box 12, the first sub-box 11 and the second sub-box 12 cover each other, and the first sub-box 11 and the second sub-box 12 jointly define the accommodating space for accommodating the battery cell 20. The second sub-box 12 may be a hollow structure being open on one side, the first sub-box 11 may be a plate-shaped structure, and the first sub-box 11 covers an open side of the second sub-box 12, so that the first sub-box 11 and the second sub-box 12 jointly define the accommodating space. Alternatively, each of the first sub-box 11 and the second sub-box 12 may be a hollow structure being open on one side, and an open side of the first sub-box 11 covers an open side of the second sub-box 12.

In the battery 100, there may be a plurality of battery cells 20, and the plurality of battery cells 20 may be connected in series, parallel, or series-parallel, where series-parallel connection means that both series connection and parallel connection exist among the plurality of battery cells 20. The plurality of battery cells 20 may be directly connected in series, parallel, or series-parallel together, and then a whole formed by the plurality of battery cells 20 are accommodated in the box 10. Certainly, the battery 100 may alternatively be in the form of a plurality of battery modules formed by the plurality of battery cells 20 that are first connected in series, parallel, or series-parallel, and the plurality of battery modules are then connected in series, parallel, or series-parallel to form a whole and accommodated in the box 10. The battery 100 may also include other structures, for example, the battery 100 may further include a bus component for implementing an electrical connection between the plurality of battery cells 20.

The battery cell 20 may be a secondary battery or a primary battery. The battery cell 20 may alternatively be a lithium-sulfur battery, a sodium-ion battery, or a magnesium-ion battery, but is not limited thereto.

Figure 3:
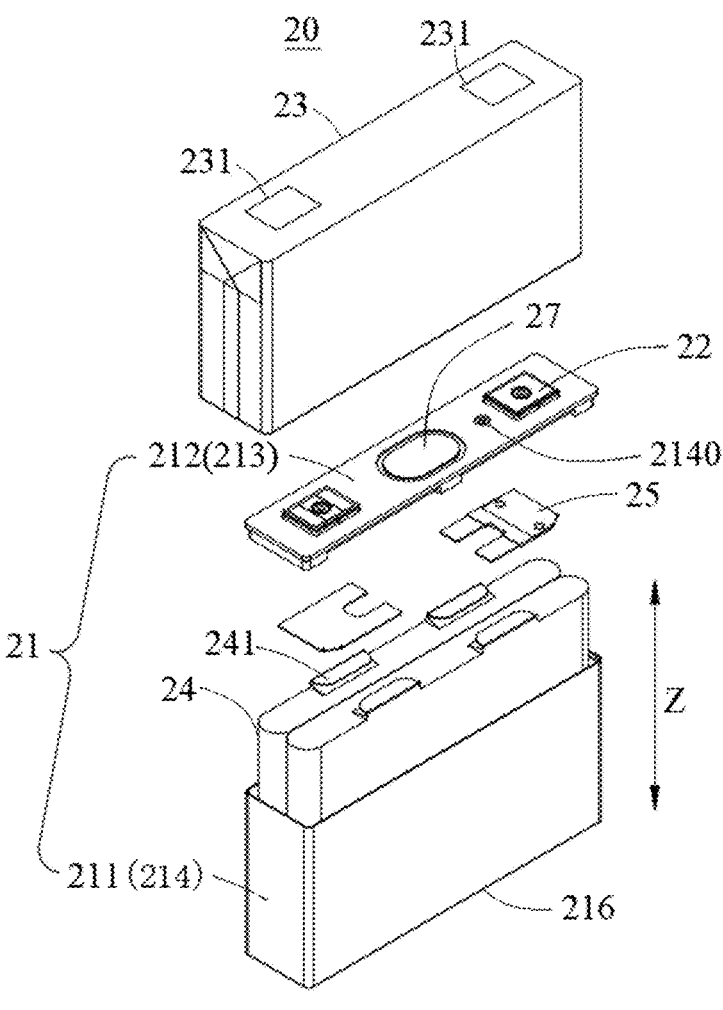
FIG. 3 is an exploded view of a battery cell according to some embodiments of this application.
Figure 4:
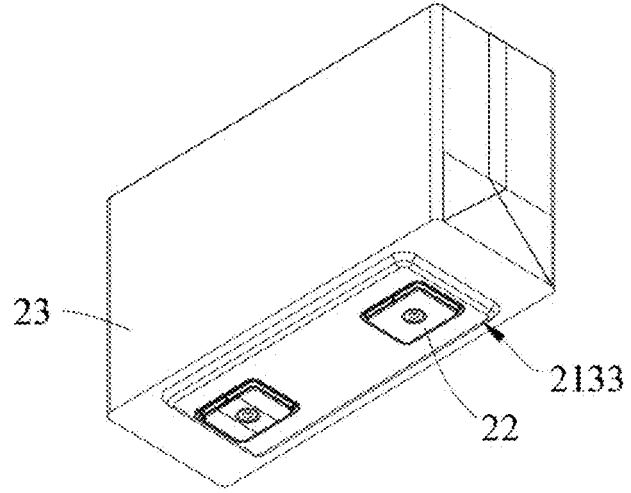
FIG. 4 is a schematic diagram of a structure of a battery cell according to some embodiments of this application.
Figure 5:
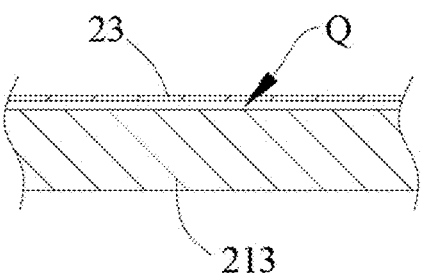
FIG. 5 is a schematic diagram of a cavity between a protective member and a first end wall according to some embodiments of this application.

FIG. 3 is an exploded view of a battery cell according to some embodiments of this application; FIG. 4 is a schematic diagram of a structure of a battery cell according to some embodiments of this application; and FIG. 5 is a schematic diagram of a cavity between a protective member and a first end wall according to some embodiments of this application. An embodiment of this application provides a battery cell 20. The battery cell 20 includes a housing 21, an electrode terminal 22, and a protective member 23. The housing 21 includes a first end wall 213, the electrode terminal 22 is disposed on the first end wall 213, and the protective member 23 covers an outer surface of the first end wall 213. A first through hole 231 is provided on the protective member 23, and the first through hole 231 is configured to expose the electrode terminal 22. A cavity Q configured to store liquid is formed between the protective member 23 and the first end wall 213.

The housing 21 includes a shell 211 and an end cap 212. The shell 211 has an opening, and the end cap 212 closes the opening. The end cap 212 and the shell 211 are connected to form an accommodating space, to isolate an internal environment of the battery cell 20 from an external environment.

The battery cell 20 may further include an electrode assembly 24 and an adapting member 25. The electrode assembly 24 is disposed in the accommodating space. The adapting member 25 is configured to implement an electrical connection between the electrode assembly 24 and the electrode terminal 22.

The shell 211 is an assembly configured to form the internal environment of the battery cell 20 together with the end cap 212, where the formed internal environment may be configured to accommodate the electrode assembly 24, an electrolyte solution, and another component. The shell 211 and the end cap 212 may be independent components. The shell 211 may have a plurality of shapes and sizes. Specifically, a shape of the shell 211 may be determined according to a specific shape and size of the electrode assembly 24. The shell 211 may be made of a plurality of materials, such as copper, iron, aluminum, stainless steel, aluminum alloy, or plastic, which is not particularly limited in the embodiments of this application. The embodiments of this application are described by using an example in which the shell 211 is in a shape of a cuboid.

The end cap 212 refers to a component that covers the opening of the shell 211 to isolate the internal environment of the battery cell 20 from the external environment. A shape of the end cap 212 is not limited and may be adapted to the shape of the shell 211 to fit the shell 211. Optionally, the end cap 212 may be made of a material with specified hardness and strength (for example, aluminum alloy), so that the end cap 212 is less likely to deform under extrusion and collision, enabling the battery cell 20 to have higher structural strength and enhanced safety performance. A functional component such as the electrode terminal 22 may be disposed on the end cap 212. The electrode terminal 22 may be configured to be electrically connected to the electrode assembly 24, to output or input electric energy of the battery cell 20. The end cap 212 may also be made of a plurality of materials, such as copper, iron, aluminum, stainless steel, aluminum alloy, or plastic, which is not particularly limited in the embodiments of this application. In some embodiments, an insulating structure may be further disposed on an inner side of the end cap 212. The insulating structure may be configured to isolate electrical connection components in the shell 211 from the end cap 212, to reduce a risk of a short circuit. For example, the insulating structure may be made of plastic, rubber, or the like.

The electrode assembly 24 is a component in the battery cell 20 that undergoes electrochemical reactions. The shell 211 may include one or more electrode assemblies 24.

The first end wall 213 is a wall of the housing 21 that encloses the accommodating space. That is, the first end wall 213 and another wall of the housing 21 enclose the accommodating space configured to accommodate the electrode assembly 24. The first end wall 213 may be the end cap 212, or may be a wall of the shell 211, for example, a wall of the shell 211 away from the opening.

In some embodiments, the first end wall 213 may be the end cap 212.

The protective member 23 may be a component that performs an electrical isolation function. The protective member 23 is disposed on an outer surface of the housing 21, to electrically isolate the housing 21 from another component, thereby reducing a risk of a short circuit caused by contact between a positive electrode and a negative electrode.

In this application, the liquid may be at least one of an electrolyte solution, an additive, or condensate.

During use, the first end wall 213 may be located at a bottom of the battery cell 20. In this case, the battery cell 20 is inverted and used.

In this application, the protective member 23 may cover most regions of the outer surface of the first end wall 213, and the most regions may be regions of the outer surface of the first end wall 213 other than a region corresponding to the electrode terminal 22.

The first through hole 231 is a hole that is of the protective member 23 and that is configured to expose the electrode terminal 22. The electrode terminal 22 is exposed from the first through hole 231, so that the electrode terminal 22 is electrically connected to another conductive component, thereby exporting electric energy of the battery cell 20.

The outer surface of the first end wall 213 may be a surface of the first end wall 213 that faces away from the inside of the battery cell 20, that is, the outer surface of the first end wall 213 may be a surface of the first end wall 213 that faces away from the accommodating space.

The electrode terminal 22 is a component mounted on the first end wall 213. The electrode terminal 22 may be electrically connected to the electrode assembly 24, to implement input or output of the electric energy of the battery cell 20. In some embodiments, the electrode terminal 22 may be referred to as a terminal. In some embodiments, two electrode terminals 22 with opposite polarities may be mounted on the first end wall 213. For example, the two electrode terminals 22 are respectively a positive electrode terminal and a negative electrode terminal, and the two electrode terminals 22 are spaced apart.

The cavity Q is a space formed between the protective member 23 and the first end wall 213, and the cavity Q can store the liquid located between the protective member 23 and the first end wall 213. The cavity Q may be a space enclosed by the protective member 23 and a concave portion of the first end wall 213. The concave portion may be a region enclosed by a protruding portion of the outer surface of the first end wall 213 and the outer surface of the first end wall 213. Alternatively, the concave portion may be a groove formed on the outer surface of the first end wall 213.

In this application, because the protective member 23 covers the outer surface of the first end wall 213, and the cavity Q configured to store the liquid is formed between the protective member 23 and the first end wall 213. In a scenario in which the battery cell 20 is inverted and used, the first end wall 213 on which the electrode terminal 22 is disposed is located at the bottom of the battery cell 20. When the bottom of the battery cell 20 is subject to an impact, the first end wall 213 easily deforms, causing the liquid inside the battery cell 20 to flow out from the first end wall 213 damaged by deformation. The liquid easily flows into the cavity Q, which can slow down liquid dropping, and reduce a risk of a short circuit caused by contact between a positive electrode and a negative electrode that is caused by liquid splashing. In this way, the battery cell 20 has relatively high reliability.

According to some embodiments of this application, the cavity Q is provided around the electrode terminal 22.

An extension track of the cavity Q may be in an annular shape, and the cavity Q surrounds an outer periphery of the electrode terminal 22.

In the foregoing solution, the cavity Q is provided around the electrode terminal 22, so that the liquid can be stored on a periphery of the electrode terminal 22, which has a relatively good constraining effect on the liquid, and can slow down flow of the liquid toward the electrode terminal 22.

Figure 6:
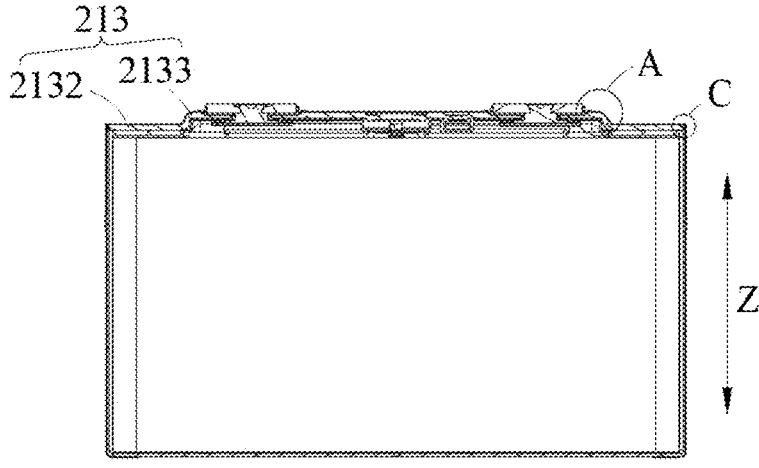
FIG. 6 is a cross-sectional view of a battery cell according to some embodiments of this application.
Figure 7:
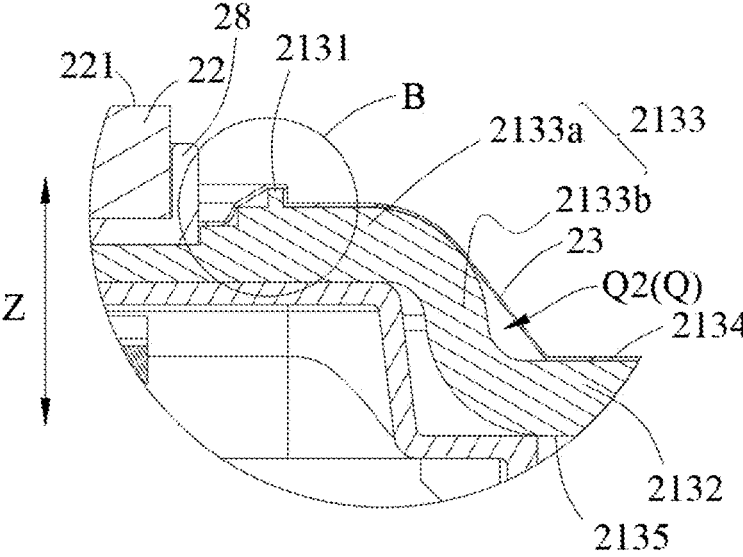
FIG. 7 is a partially enlarged view of a position A in FIG. 6.
Figures 8, 9:
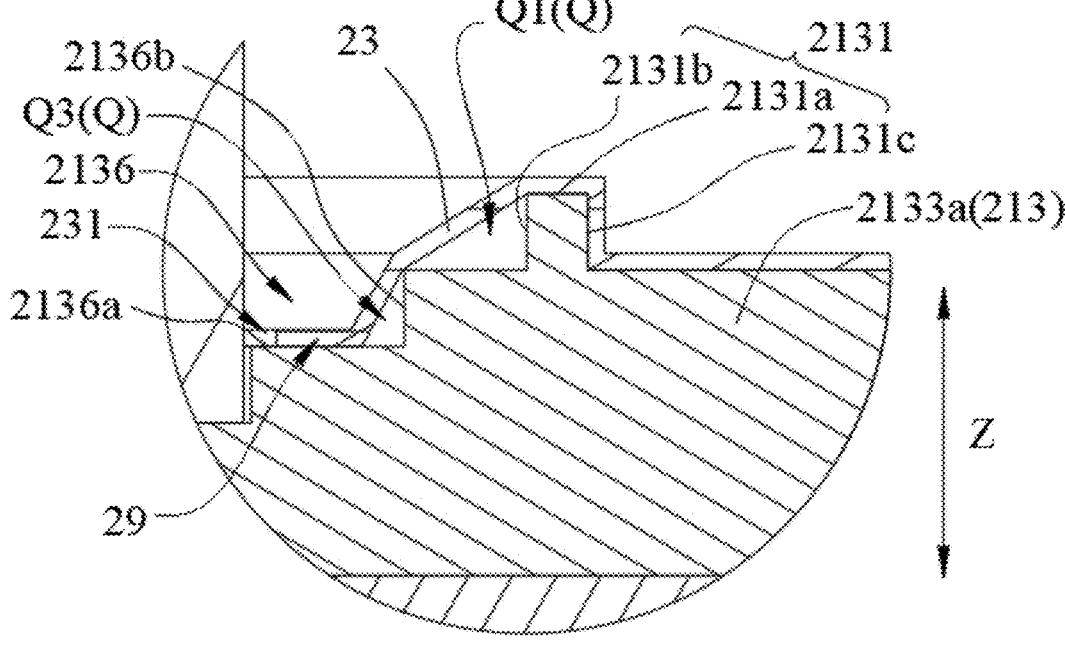
FIG. 8 is a partially enlarged view of a position B in FIG. 7.
FIG. 9 is a schematic diagram of a connection between a protective member and a first end wall according to some embodiments of this application.

FIG. 6 is a cross-sectional view of a battery cell according to some embodiments of this application; FIG. 7 is a partially enlarged view of a position A in FIG. 6; and FIG. 8 is a partially enlarged view of a position B in FIG. 7. According to some embodiments of this application, the battery cell 20 further includes an insulating member 28, and the insulating member 28 is disposed between the electrode terminal 22 and the first end wall 213; and a part of the protective member 23 that surrounds the first through hole 231 is connected to the first end wall 213 or the insulating member 28 to form a first connection portion 29, the first connection portion 29 is disposed around the electrode terminal 22, and the cavity Q is separated from the first connection portion 29.

The insulating member 28 is an insulating component disposed between the electrode terminal 22 and the first end wall 213, and is configured to insulate and isolate the electrode terminal 22 from the first end wall 213.

The part of the protective member 23 that surrounds the first through hole 231 is a region of the protective member 23 that is close to the first through hole 231, and the region is disposed around the first through hole 231.

The part of the protective member 23 that surrounds the first through hole 231 is connected to the first end wall 213 to form the first connection portion 29. Alternatively, the part of the protective member 23 that surrounds the first through hole 231 and the insulating member 28 are connected to form the first connection portion 29. The protective member 23 is fixed to the first end wall 213 or the insulating member 28 by using the first connection portion 29.

The first connection portion 29 is disposed around electrode terminal 22, and liquid located between the protective member 23 and the first end wall 213 does not easily flow to the electrode terminal 22 through the first through hole 231.

That the cavity Q is separated from the first connection portion 29 means that the cavity Q is not in contact with the first connection portion 29, and a boundary of the cavity Q does not extend to the first connection portion 29.

In the foregoing solution, the part of the protective member 23 that surrounds the first through hole 231 is connected to the first end wall 213 or the insulating member 28, and the cavity Q is separated from the first connection portion 29. The cavity Q stores the liquid located between the protective member 23 and the first end wall 213, so that flow of the liquid toward the first connection portion 29 can be slowed down, failure of the first connection portion 29 is slowed down, and a risk that the liquid flows out through the first through hole 231 is reduced.

Referring to FIG. 6 to FIG. 8, according to some embodiments of this application, a protrusion 2131 is formed on the outer surface of the first end wall 213, the protective member 23 covers the protrusion 2131, and the cavity Q includes a first sub-cavity Q1 located on a peripheral side of the protrusion 2131.

The protrusion 2131 is a protruding structure formed on the outer surface of the first end wall 213. The protrusion 2131 and the first end wall 213 may be integrally formed, or the protrusion 2131 and the first end wall 213 may be separately disposed and are integrally fixed. For example, the protrusion 2131 may be a relatively thick region of the first end wall 213 that remains after thinning processing, or the protrusion 2131 may be a component independent of a body of the first end wall 213, and the protrusion 2131 may be connected to the first end wall 213 in a soldering, adhesive, or clamping manner.

The protective member 23 covers the protrusion 2131, and a part that is not in contact with the protective member 23 and the protrusion 2131 forms the first sub-cavity Q1, to store liquid.

The peripheral side of the protrusion 2131 refers to two sides in an extension direction of the protrusion 2131, or may be two sides in a thickness direction of the protrusion 2131.

When the protective member 23 is assembled with the housing 21, the protective member 23 covers the outer surface of the first end wall 213, and the protective member 23 covers the protrusion 2131 protruding from the outer surface of the first end wall 213. The protrusion 2131 jacks up the protective member 23 toward a side of the first end wall 213 that faces away from inside of the housing 21, so that the protective member 23 is not in contact with a region of the first end wall 213 in which the protrusion 2131 is disposed. In addition, the protective member 23 is not in contact with a part of a surface of the protrusion 2131. In this way, the first sub-cavity Q1 is formed between the protective member 23 and the peripheral side of the protrusion 2131.

The first sub-cavity Q1 may be a composition unit of the cavity Q. The first sub-cavity Q1 may be formed by cooperation between the protective member 23 and the protrusion 2131. For example, there may be a gap between the protective member 23 and the part of the surface of the protrusion 2131. The gap forms the first sub-cavity Q1. That is, a part of the protective member 23 may be not in contact with the part of the surface of the protrusion 2131.

In the foregoing embodiment, the protective member 23 covers the protrusion 2131, so that the first sub-cavity Q1 can be formed near the protrusion 2131 by using a structure of the protrusion 2131, to store more liquid.

Referring to FIG. 8, according to some embodiments of this application, the protrusion 2131 is disposed around an electrode terminal 22, the protrusion 2131 has a first end surface 2131*a* facing away from the inside of the housing 21, an inner peripheral surface 2131*b* facing the electrode terminal 22, and an outer peripheral surface 2131*c* facing away from the electrode terminal 22, and the protective member 23 is attached to the first end surface 2131*a*. The protective member 23 is not attached to the inner peripheral surface 2131*b*, to form the first sub-cavity Q1 between the protective member 23 and the inner peripheral surface 2131*b*; and/or the protective member 23 is not attached to the outer peripheral surface 2131*c*, to form the first sub-cavity Q1 between the protective member 23 and the outer peripheral surface 2131*c*.

"The protrusion 2131 is disposed around the electrode terminal 22" means that, the protrusion 2131 is in an annular structure, and the electrode terminal 22 is located inside the annular structure.

The inner peripheral surface 2131*b* and the outer peripheral surface 2131*c* extend along the extension direction of the protrusion 2131, and the inner peripheral surface 2131*b* and the outer peripheral surface 2131*c* are respectively connected to two ends of the first end surface 2131*a*.

The first sub-cavity Q1 may be located on a side of the protrusion 2131 facing the electrode terminal 22 and/or a side of the protrusion 2131 facing away from the electrode terminal 22. Referring to FIG. 8, when the protective member 23 is not attached to the inner peripheral surface 2131*b*, liquid can be stored between the protective member 23 and the inner peripheral surface 2131*b*. In this case, the first sub-cavity Q1 is located on a side of the protrusion 2131 that faces the electrode terminal 22. When the protective member 23 is not attached to the outer peripheral surface 2131*c*, liquid can be stored between the protective member 23 and the outer peripheral surface 2131*c*. In this case, the first sub-cavity Q1 is located on a side of the protrusion 2131 that faces away from the electrode terminal 22.

The first sub-cavity Q1 may be located on the side of the protrusion 2131 that faces the electrode terminal 22, or the first sub-cavity Q1 may be located on the side of the protrusion 2131 that faces away from the electrode terminal 22, or the first sub-cavity Q1 may be located on the side of the protrusion 2131 that faces the electrode terminal 22 and the side of the protrusion 2131 that faces away from the electrode terminal 22. The side of the protrusion 2131 that faces the electrode terminal 22 and the side of the protrusion 2131 that faces away from the electrode terminal 22 may be two opposite sides in the thickness direction of the protrusion 2131.

Optionally, as shown in FIG. 7 and FIG. 8, the first sub-cavity Q1 may be located on the side of the protrusion 2131 that faces the electrode terminal 22.

In the foregoing embodiment, the protrusion 2131 is disposed around the electrode terminal 22, and the first sub-cavity Q1 is located on the side of the protrusion 2131 that faces the electrode terminal 22 and/or the side of the protrusion 2131 that faces away from the electrode terminal 22, to form blocking on the periphery of the electrode terminal 22, and slow down flow of the liquid between the protective member 23 and the first end wall 213 toward the electrode terminal 22, thereby reducing a risk of a short circuit caused by contact between the liquid and the electrode terminal 22.

According to some embodiments of this application, the first sub-cavity Q1 is provided around the electrode terminal 22, and a cross section of the first sub-cavity Q1 is in a shape of a triangle.

An extension track of the first sub-cavity Q1 is in an annular shape, and the annular first sub-cavity Q1 is disposed around the electrode terminal 22. When liquid exists between the protective member 23 and the first end wall 213, and when the liquid flows toward the electrode terminal 22, the liquid can enter the first sub-cavity Q1, so that the flow of the liquid toward the electrode terminal 22 is slowed down.

The cross section of the first sub-cavity Q1 is a plane of the first sub-cavity Q1 obtained by a plane perpendicular to an extension direction of the first sub-cavity Q1. The cross section of the first sub-cavity Q1 is in a shape of a triangle, so that the first sub-cavity Q1 has a relatively large accommodating space.

In the foregoing embodiment, the first sub-cavity Q1 is provided on the periphery of the electrode terminal 22, and the cross section of the first sub-cavity Q1 is in the shape of a triangle, so that more liquid can be stored in the first sub-cavity Q1, which has a good constraining effect on the liquid, and further slows down the flow of the liquid toward the electrode terminal 22.

Referring to FIG. 7, according to some embodiments of this application, the electrode terminal 22 has a second end surface 221 facing away from the inside of the housing 21, and the protrusion 2131 does not extend out of the second end surface 221 along a thickness direction Z of the first end wall 213.

In the figure, a direction indicated by a letter Z is the thickness direction of the first end wall 213.

The second end surface 221 may be an end surface of the electrode terminal 22 that is located inside the battery cell 20, and the end surface is an end surface of one end of the electrode terminal 22 in the thickness direction Z of the first end wall 213.

The electrode terminal 22 may further have a third end surface (not shown in the figure). The third end surface and the second end surface 221 are disposed opposite to each other along the thickness direction Z of the first end wall. The third end surface may be located inside the housing. The third end surface may be configured to be electrically connected to a tab 241 (referring to FIG. 3) of the electrode assembly 24.

"The protrusion 2131 does not extend out of the second end surface 221 along the thickness direction Z of the first end wall 213" means that, a distance between the second end surface 221 and the outer surface of the first end wall 213 is less than a height by which the protrusion 2131 protrudes from the outer surface of the first end wall 213. In this case, to prevent the protective member 23 from affecting a connection between the electrode terminal 22 and another component, the protective member 23 also does not extend out of the second end surface 221 along the thickness direction Z of the first end wall 213.

In some embodiments, along the thickness direction Z of the first end wall 213, a height by which the protrusion 2131 protrudes from the outer surface of the first end wall 213 is greater than or equal to 0.5 mm. If the height by which the protrusion 2131 protrudes from the outer surface of the first end wall 213 is relatively small (for example, less than 0.5 mm), a space of the first sub-cavity Q1 is relatively small, and a capacity of the liquid stored in the first sub-cavity Q1 is relatively small. If the height by which the protrusion 2131 protrudes from the outer surface of the first end wall 213 is relatively large (for example, the protrusion 2131 extends out of the second end surface 221, or the protective member 23 covering the protrusion 2131 extends out of the second end surface 221), the connection between the electrode terminal 22 and another component is affected.

In the foregoing embodiment, the protrusion 2131 does not extend out of the second end surface 221 along the thickness direction Z of the first end wall 213, so that the second end surface 221 is connected to another component, facilitating input or output of electric energy.

Referring to FIG. 7, according to some embodiments of this application, the electrode terminal 22 has a second end surface 221 facing away from the inside of the housing 21, and the protective member 23 does not extend out of the second end surface 221 along the thickness direction Z of the first end wall 213.

Referring to FIG. 6 and FIG. 7, according to some embodiments of this application, the first end wall 213 includes a body 2132 and a protruding portion 2133, the body 2132 is disposed around the protruding portion 2133, the body 2132 includes a first surface 2134 facing away from the inside of the housing 21, the protruding portion 2133 protrudes from the first surface 2134, the electrode terminal 22 is disposed on the protruding portion 2133, and the cavity Q includes a second sub-cavity Q2 located at a joint between the protruding portion 2133 and the body 2132.

The body 2132 may be most regions of the first end wall 213, and the protruding portion 2133 may be a region of the first end wall 213 that protrudes from the body 2132.

That the body 2132 is disposed around the protruding portion 2133 may be that the protruding portion 2133 is not disposed at an edge of the body 2132. In some embodiments, the protruding portion 2133 may be disposed in a middle part in a width direction of the body 2132.

The first surface 2134 may be a surface of the body 2132 that faces away from the inside of the housing 21, that is, the first surface 2134 may be a part of the outer surface of the first end wall 213.

The body 2132 may further include a second surface 2135, the second surface 2135 is disposed opposite to the first surface 2134 along the thickness direction Z of the first end wall 213, and the second surface 2135 faces the inside of the housing 21.

In some embodiments, the protruding portion 2133 may form a groove at a corresponding position on the second surface 2135. In other words, the protruding portion 2133 may be a hollow structure. In this case, a space occupied by the electrode terminal 22 inside the housing 21 can be reduced, so that the battery cell 20 has more active materials, and the battery cell 20 can have a relatively high energy density.

Compared with a case in which the electrode terminal 22 is disposed on the body 2132, when the electrode terminal 22 is disposed on the protruding portion 2133, the second end surface 221 of the electrode terminal 22 is further away from the first surface 2134.

The second sub-cavity Q2 is a space that is formed at the joint between the protruding portion 2133 and the body 2132 and that is used for storing liquid. The second sub-cavity Q2 may be formed by a gap between the protective member 23 and the joint between the protruding portion 2133 and the body 2132. In this case, the protective member 23 is not in contact with the joint between the protruding portion 2133 and the body 2132.

In the foregoing embodiment, the electrode terminal 22 is disposed on the protruding portion 2133, to facilitate the connection between the electrode terminal 22 and the another component (such as a bus component). The second sub-cavity Q2 is formed at the joint between the protruding portion 2133 and the body 2132, to store the liquid by using the structure of the protruding portion 2133.

According to some embodiments of this application, the second sub-cavity Q2 is provided around the protruding portion 2133.

In other words, the second sub-cavity Q2 is provided around the electrode terminal 22.

In the foregoing embodiment, the second sub-cavity Q2 is provided around the protruding portion 2133, and the second sub-cavity Q2 has a relatively large space for storing the liquid, to store more liquid.

Referring to FIG. 7, according to some embodiments of this application, the protruding portion 2133 includes a first wall portion 2133a and a second wall portion 2133b, the first wall portion 2133a is disposed parallel to the body 2132, the second wall portion 2133b is disposed around the first wall portion 2133a, the second wall portion 2133b connects the first wall portion 2133a and the body 2132, the electrode terminal 22 is disposed on the first wall portion 2133a, and the second sub-cavity Q2 is located at a joint between the second wall portion 2133b and the body 2132.

The first wall portion 2133a is disposed on a side of the body 2132 that faces away from the inside of the battery cell 20. The first wall portion 2133a is disposed parallel to the second wall portion 2133b. The second wall portion 2133b is disposed around the first wall portion 2133a, so that the protruding portion 2133 is a hollow structure. The first wall portion 2133a and the second wall portion 2133b may enclose a space, and the space can accommodate a part of the electrode terminal 22.

The electrode terminal 22 is disposed on the first wall portion 2133a. A second through hole (not shown in the figure) may be provided on the first wall portion 2133a. A part of the electrode terminal 22 may extend into the second through hole, to be electrically connected to the tab of the electrode assembly 24. A part of the electrode terminal 22 may be exposed from the second through hole, to be electrically connected to the bus component.

The protective member 23 covers the first wall portion 2133a and the second wall portion 2133b. The protective member 23 may be attached to the first wall portion 2133a. The protective member 23 may be not attached to a part of the second wall portion 2133b close to the body 2132 or a part of the body 2132 close to the second wall portion 2133b, to form the second sub-cavity Q2 at the joint between the second wall portion 2133b and the body 2132.

In the foregoing embodiment, the second sub-cavity Q2 is located at the joint between the second wall portion 2133*b* and the body 2132, and the electrode terminal 22 is disposed on the first wall portion 2133*a*, which can slow down the flow of the liquid between the protective member 23 and the first end wall 213 toward the electrode terminal 22, and reduce a risk of a short circuit caused by contact between the liquid and the electrode terminal 22.

Referring to FIG. 7 and FIG. 8, according to some embodiments of this application, a first groove 2136 is provided on the outer surface of the first end wall 213, the electrode terminal 22 is disposed on a groove bottom wall 2136*a* of the first groove 2136, a part of the protective member 23 that surrounds the first through hole 231 is connected to the groove bottom wall 2136*a* of the first groove 2136, and the cavity Q includes a third sub-cavity Q3 located at a joint between the groove bottom wall 2136*a* of the first groove 2136 and a groove side wall 2136*b* of the first groove 2136.

The first groove 2136 is a groove provided on the outer surface of the first end wall 213. The electrode terminal 22 is disposed on the groove bottom wall 2136*a* of the first groove 2136, so that a height by which the electrode terminal 22 protrudes from the outer surface of the first end wall 213 can be reduced.

The electrode terminal 22 is not in contact with the groove side wall 2136*b* of the first groove 2136. After the part of the protective member 23 that surrounds the first through hole 231 is connected to the groove bottom wall 2136*a* of the first groove 2136, because the first groove 2136 recesses on the outer surface of the first end wall 213 toward the inside of the battery cell 20, the protective member 23 is connected to the outer surface of the first end wall 213, so that the protective member 23 is not in contact with a region of the groove bottom wall 2136*a* of the first groove 2136 that is close to the groove side wall 2136*b* of the first groove 2136, and the protective member 23 is not in contact with a region of the groove side wall 2136*b* of the first groove 2136 that is close to the groove bottom wall 2136*a* of the first groove 2136, so that there is a gap between the protective member 23 and the joint between the groove bottom wall 2136*a* of the first groove 2136 and the groove side wall 2136*b* of the first groove 2136, and the gap forms the third sub-cavity Q3.

In the foregoing embodiment, the electrode terminal 22 is disposed on the groove bottom wall 2136*a* of the first groove 2136, so that a space occupied by the electrode terminal 22 in the thickness direction Z of the first end wall 213 can be reduced. In addition, a space between the protective member 23 and the joint between the groove bottom wall 2136*a* of the first groove 2136 and the groove side wall 2136*b* of the first groove 2136 forms the third sub-cavity Q3, so that the space of the first groove 2136 is used to form the space for storing the liquid.

According to some embodiments of this application, the third sub-cavity Q3 is provided around the electrode terminal 22, and a cross section of the third sub-cavity Q3 is in a shape of a triangle.

An extension track of the third sub-cavity Q3 is in an annular shape, and the annular first sub-cavity Q1 is disposed around the electrode terminal 22.

The cross section of the third sub-cavity Q3 is a plane of the third sub-cavity Q3 obtained by a plane perpendicular to an extension direction of the third sub-cavity Q3. The cross section of the third sub-cavity Q3 is in the shape of a triangle, so that the third sub-cavity Q3 has a relatively large accommodating space.

The third sub-cavity Q3 is provided around the electrode terminal 22, and the cross section of the third sub-cavity Q3 is in the shape of a triangle, so that the third sub-cavity Q3 has a relatively large space for storing the liquid, to store more liquid.

FIG. 9 is a schematic diagram of a connection between a protective member and a first end wall according to some embodiments of this application. According to some embodiments of this application, the first end wall 213 includes a first part 2137, surface energy on an outer surface of the first part 2137 is greater than or equal to surface energy on an outer surface of another part of the first end wall 213, the battery cell 20 further includes an adhesive layer 26, and the protective member 23 is connected to the first part 2137 by using the adhesive layer 26.

The first part 2137 is a part forming the first end wall 213, and the first part 2137 may be a part having maximum surface energy on the outer surface of the first end wall 213. When a material of the first part 2137 is the same as a material of the another part of the first end wall 213, the surface energy on the outer surface of the first part 2137 is the same as the surface energy on the outer surface of the another part of the first end wall 213. When a material of the first part 2137 is different from a material of the another part of the first end wall 213, the surface energy on the outer surface of the first part 2137 is greater than the surface energy on the material of the another part of the first end wall 213.

The outer surface of the first part 2137 may be a surface of the first part 2137 that faces away from the inside of the housing 21, and the outer surface of the first part 2137 may be connected to the protective member 23 by using the adhesive layer 26.

The first end wall 213 may further include a second part 2138, the first part 2137 is connected to the second part 2138, and the surface energy on the outer surface of the first part 2137 is greater than surface energy on an outer surface of the second part 2138.

In some embodiments, the first part 2137 may be formed on a surface of the second part 2138. For example, the first part 2137 may be formed on the surface of the second part 2138 in a manner of mechanical surface processing. The manner of mechanical surface processing may be sandblasting, shot blasting, burnishing, tumbling, polishing, brushing, spraying, or painting. For another example, the first part 2137 may be formed on the surface of the second part 2138 in a manner of chemical surface processing, such as bluing and blackening, phosphating, pickling, chemical plating of various pieces of metal and various alloy, surface superhardening processing, quenching-polishing-quenching processing, or chemical oxidation. For another example, the first part 2137 is formed on the surface of the second part 2138 in a manner of electrochemical processing, such as anodicoxidation, electrochemical polishing, or electroplating. For another example, the first part 2137 is formed on the surface of the second part 2138 in a manner of modern surface processing, such as chemical vapor deposition, physical vapor deposition, ion injection, ion plating, or laser surface processing.

In some embodiments, the first part 2137 and the second part 2138 may be made of different types of materials, and the first part 2137 and the second part 2138 may be connected to each other through a process such as riveting or soldering.

In some embodiments, the surface energy of the first part 2137 (namely, an adhesion between the first part 2137 and the adhesive layer 26) may be measured by using a peeling test method, for example, may be measured by using a peeling tester.

In some embodiments, the first part 2137 may be an oxide layer. In some embodiments, when the housing 21 is made of aluminum, the first part 2137 may be an oxide layer, such as aluminum oxide, chromium oxide, or nickel oxide, formed on the outer surface of the second part 2138.

In the foregoing embodiment, because the surface energy on the outer surface of the first part 2137 is relatively large, the first part 2137 and the adhesive have a relatively good adhesion effect, and the protective member 23 is connected to the first part 2137 by using the adhesive layer 26, so that there is relatively good connection stability between the protective member 23 and the first end wall 213.

In some embodiments, in an embodiment in which the first groove 2136 is provided on the first end wall 213, the first part 2137 is disposed on the groove bottom wall 2136*a* of the first groove 2136, and the part of the protective member 23 that surrounds the first through hole 231 is connected to the first part 2137 by using the adhesive layer 26. In this case, the protective member 23 and the first end wall 213 have a relatively good adhesion effect, and the flow of the liquid between the protective member 23 and the first end wall 213 from the first through hole 231 toward the electrode terminal 22 is slowed down.

Figure 10:
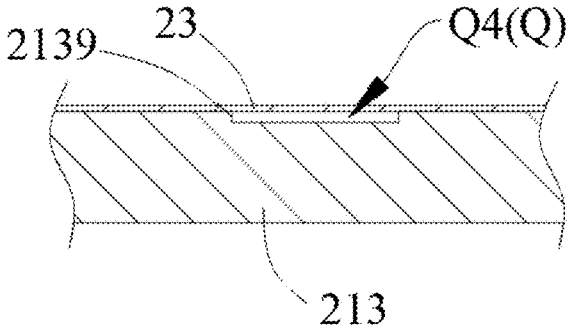
FIG. 10 is a schematic diagram of cooperation between a second groove and a protective member according to some embodiments of this application.

FIG. 10 is a schematic diagram of cooperation between a second groove and a protective member according to some embodiments of this application. According to some embodiments of this application, the second groove 2139 is provided on the outer surface of the first end wall 213, the protective member 23 covers the second groove 2139, and the cavity Q includes a fourth sub-cavity Q4 enclosed by the second groove 2139 and the protective member 23.

The second groove 2139 is a groove formed on the outer surface of the first end wall 213, and the groove is configured to accommodate the liquid located between the protective member 23 and the first end wall 213.

In the foregoing embodiment, the protective member 23 covers the second groove 2139 to form the fourth sub-cavity Q4, so that a space between the protective member 23 and the first end wall 213 is used to store the liquid.

Figure 11:
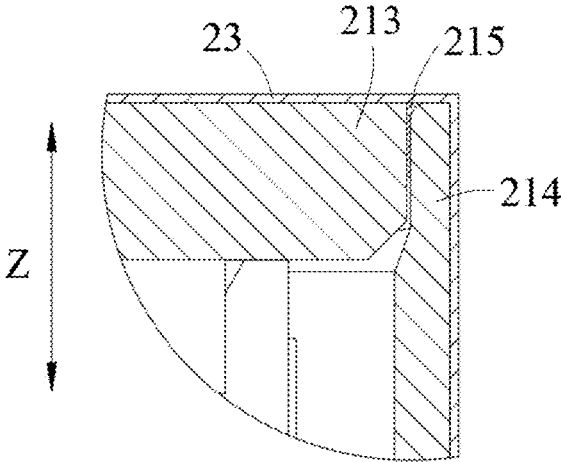
FIG. 11 is a partially enlarged view of a position C in FIG. 6.

Referring to FIG. 3, and further referring to FIG. 11, FIG. 11 is a partially enlarged view of a position C in FIG. 6. According to some embodiments of this application, the housing 21 further includes a side wall 214, the side wall 214 is disposed around the first end wall 213, and the protective member 23 covers at least a part of an outer surface of the side wall 214.

The side wall 214 may be a peripheral wall of the housing 21. When the first end wall 213 is a part of the housing 21 in the thickness direction Z of the first end wall 213, the side wall 214 may be a part of the housing 21 in a direction perpendicular to the thickness direction Z.

The side wall 214 may be a wall portion of the shell 211, the opening of the shell 211 may be formed on one end of the side wall 214, and the first end wall 213 may close the opening.

The outer surface of the side wall 214 may be a surface of the side wall 214 that faces away from inside of the battery cell 20.

The protective member 23 may cover a part of the outer surface of the side wall 214, or the protective member 23 may cover the whole outer surface of the side wall 214.

The protective member 23 covers at least a part of the outer surface of the side wall 214. When the protective member 23 is assembled with the housing 21, the protective member 23 may first cover the first end wall 213 and then cover the side wall 214.

In the foregoing embodiment, the protective member 23 covers at least a part of the outer surface of the side wall 214, so that there is a relatively large coverage area between the protective member 23 and the housing 21, there is relatively high connection stability between the protective member 23 and the housing 21, and a risk that the protective member 23 falls off the outer surface of the housing 21 is reduced.

Referring to FIG. 11, according to some embodiments of this application, the first end wall 213 and the side wall 214 are connected to form a second connection portion 215, and the protective member 23 covers the second connection portion 215.

The second connection portion 215 may be a weld formed by soldering the first end wall 213 and the side wall 214, so that the first end wall 213 is firmly connected to the side wall 214.

If the second connection portion 215 is cracked, for example, pseudo soldering occurs at a joint between the first end wall 213 and the side wall 214, and the second connection portion 215 is easily cracked by a force, liquid inside the battery cell 20 easily leaks out through the cracked second connection portion 215. The protective member 23 covers the second connection portion 215 and can constrain the liquid that leaks out through the cracked second connection portion 215, to reduce a risk of liquid splashing.

According to some embodiments of this application, the battery cell 20 may further include a pressure relief mechanism 27. The pressure relief mechanism 27 is disposed on the first end wall 213, where the protective member 23 covers the pressure relief mechanism 27.

The pressure relief mechanism 27 may be configured, when internal pressure or temperature of the battery cell 20 reaches a threshold, to be actuated to release the internal pressure of the battery cell 20.

The pressure relief mechanism 27 is disposed on the first end wall 213. For example, the pressure relief mechanism 27 may be disposed on the end cap 212, or may be disposed in the shell 211. In some embodiments, as shown in FIG. 3, the pressure relief mechanism 27 is disposed on the end cap 212. For example, the pressure relief mechanism 27 may be soldered to the end cap 212.

The liquid may leak from a weak region of the pressure relief mechanism 27, or may leak from a connection position between the pressure relief mechanism 27 and the first end wall 213. All the foregoing leakage manners belong to leakage from the pressure relief mechanism 27.

The protective member 23 covers the pressure relief mechanism 27, and also covers the connection position between the pressure relief mechanism 27 and the first end wall 213, so that when the liquid leaks from the pressure relief mechanism 27, the protective member 23 can constrain the liquid.

The pressure relief mechanism 27 may be a weak component relative to the housing 21, and the liquid easily leaks from the pressure relief mechanism 27. The protective member 23 covers the pressure relief mechanism 27, and can constrain the liquid leaking from the pressure relief mechanism 27.

According to some embodiments of this application, referring to FIG. 3, a liquid injection hole 2140 may be provided on the first end wall 213, and the protective member 23 covers the liquid injection hole 2140.

The liquid injection hole 2140 is a through hole provided on the first end wall 213, and the liquid injection hole 2140 runs through the first end wall 213 along the thickness direction Z of the first end wall 213. An electrolyte solution may be injected into the inside of the battery cell 20 through the liquid injection hole 2140. In an assembly process of the battery cell 20, after the injection of the electrolyte solution is completed, the liquid injection hole 2140 is sealed by a sealing member (not shown in the figure), to reduce a risk of leakage of the electrolyte solution. A sealing region between the liquid injection hole 2140 and the sealing member is a weak region. When a force is applied to the first end wall 213, a sealing interface between the liquid injection hole 2140 and the sealing member is easily damaged, and the liquid easily leaks from the sealing interface between the liquid injection hole 2140 and the sealing member. That is, the liquid easily leaks from the liquid injection hole 2140.

In the foregoing embodiment, although the liquid injection hole 2140 is closed, a closed region (the sealing interface between the liquid injection hole 2140 and the sealing member) of the liquid injection hole 2140 is easily damaged. The protective member 23 covers the liquid injection hole 2140 and can constrain the liquid leaking from the liquid injection hole 2140.

According to some embodiments of this application, referring to FIG. 3, the housing 21 further includes a second end wall 216, the second end wall 216 is disposed opposite to the first end wall 213, the side wall 214 connects the first end wall 213 and the second end wall 216, and the protective member 23 covers at least a part of an outer surface of the second end wall 216.

The first end wall 213 may be disposed opposite to the second end wall 216 along the thickness direction Z of the first end wall 213. In some embodiments, the first end wall 213 may be a top wall of the housing 21, and the second end wall 216 may be a bottom wall of the housing 21. The side wall 214 is a component disposed between the first end wall 213 and the second end wall 216, and is disposed around the first end wall 213 and the second end wall 216, to jointly form, with the first end wall 213 and the second end wall 216, an accommodating space for accommodating the electrode assembly 24.

That the protective member 23 covers at least a part of the outer surface of the second end wall 216 may be that, after covering the first end wall 213, the protective member 23 extends to both the side wall 214 and the second end wall 216, so that there is a relatively large coverage area between the protective member 23 and the housing 21.

In the foregoing embodiment, the protective member 23 covers at least a part of the outer surface of the second end wall 216, and after covering the first end wall 213 and the side wall 214, the protective member 23 extends to the second end wall 216, thereby further increasing the coverage area between the protective member 23 and the housing 21, and improving connection stability between the protective member 23 and the housing 21.

According to some embodiments of this application, a part of the outer surface of the second end wall 216 is not covered by the protective member 23.

In some embodiments, the housing 21 may be made of metal. For example, the housing 21 may be made of metal such as aluminum, aluminum alloy, or copper. The second end wall 216 may also be made of metal. A part of the outer surface of the second end wall 216 is not covered by the protective member 23, that is, a part of the surface of the second end wall 216 is exposed.

In the foregoing embodiment, a part of the outer surface of the second end wall 216 is not covered by the protective member 23, so that the part of the second end wall 216 that is not covered by the protective member 23 is connected to another component.

According to some embodiments of this application, the protective member 23 is an insulating film.

The insulating film may be a film-shaped component having an insulating property. In some embodiments, the insulating film may be referred to as a blue film by a person skilled in the art.

In the foregoing embodiment, the protective member 23 is an insulating film, so that the housing 21 is electrically insulated from the another component, thereby reducing a risk of a short circuit caused by contact between a positive electrode and a negative electrode.

According to some embodiments of this application, an embodiment of this application further provides a battery 100. The battery 100 may include the battery cell 20 according to any of the foregoing embodiments.

According to some embodiments of this application, an embodiment of this application further provides a power consuming device. The power consuming device may include the battery cell 20 or the battery 100 according to any of the foregoing embodiments.

The battery cell 20 or the battery 100 is configured to provide electric energy for the power consuming device. The power consuming device may be any one of the foregoing devices or systems to which the battery cell 20 or the battery 100 is applied.

According to some embodiments of this application, referring to FIG. 3 to FIG. 11, an embodiment of this application provides a battery cell 20. The battery cell 20 is in a shape of a cuboid. The battery cell 20 may include a housing 21, an electrode terminal 22, a protective member 23, an electrode assembly 24, an adapting member 25, and a pressure relief mechanism 27.

The housing 21 may include a first end wall 213, a side wall 214, and a second end wall 216. The first end wall 213 is disposed opposite to the second end wall 216 along a thickness direction Z of the first end wall 213. The side wall 214 is disposed around the first end wall 213 and the second end wall 216. The first end wall 213, the side wall 214, and the second end wall 216 enclose an accommodating space. The first end wall 213 may be an end cap 212, the side wall 214 and the second end wall 216 may be integrally formed into a shell 211, and the end cap 212 closes an opening of the shell 211. The first end wall 213 and the side wall 214 are connected to form a second connection portion 215. A liquid injection hole 2140 is provided on the first end wall 213. A second groove 2139 is provided on an outer surface of the first end wall 213. The electrode terminal 22 is disposed on the first end wall 213, the electrode assembly 24 is disposed in the accommodating space, and the electrode assembly 24 is electrically connected to the electrode terminal 22 by using the adapting member 25.

The first end wall 213 includes a body 2132 and a protruding portion 2133. The body 2132 is disposed around the protruding portion 2133. The body 2132 includes a first surface 2134 facing away from inside of the housing 21 and a second surface 2135 facing the inside of the housing 21. The protruding portion 2133 protrudes from the first surface 2134, and the protruding portion 2133 forms a groove at a corresponding position of the second surface 2135. The protruding portion 2133 includes a first wall portion 2133*a* and a second wall portion 2133*b*, the first wall portion 2133*a* is disposed parallel to the body 2132, the second wall portion 2133*b* is disposed around the first wall portion 2133*a*, and the second wall portion 2133*b* connects the first wall portion 2133*a* and the body 2132. A first groove 2136 is provided on an outer surface of the first wall portion 2133*a*, a second through hole is provided on a groove bottom wall 2136*a* of the first groove 2136, the electrode terminal 22 is disposed in the second through hole, and the electrode terminal 22 includes a second end surface 221 facing away from the inside of the battery cell 20. A protrusion 2131 is formed on the outer surface of the first wall portion 2133*a*. The protrusion 2131 does not extend out of the second end surface 221 of the electrode terminal 22 along the thickness direction Z of the first end wall 213, and the protrusion 2131 is disposed around the electrode terminal 22.

A second groove 2139 is provided on the outer surface of the first end wall 213.

The protective member 23 covers the outer surface of the first end wall 213, an outer surface of the side wall 214, and a part of an outer surface of the second end wall 216. A cavity Q configured to store liquid is formed between the protective member 23 and the first end wall 213. A first through hole 231 is provided on the protective member 23. The first through hole 231 is configured to expose the electrode terminal 22. A part of the protective member 23 that surrounds the first through hole 231 is connected to the groove bottom wall 2136*a* of the first groove 2136 to form a first connection portion 29.

The cavity Q is provided around the electrode terminal 22, and the cavity Q is separated from the first connection portion 29. The cavity Q includes a first sub-cavity Q1, a second sub-cavity Q2, a third sub-cavity Q3, and a fourth sub-cavity Q4. The first sub-cavity Q1 is provided adjacent to the protrusion 2131, and the first sub-cavity Q1 is located on a side of the protrusion 2131 that faces the electrode terminal 22. The second sub-cavity Q2 is located at a joint between the second wall portion 2133*b* and the body 2132. The third sub-cavity Q3 is located at a joint between the groove bottom wall 2136*a* of the first groove 2136 and a groove side wall 2136*b* of the first groove 2136. The fourth sub-cavity Q4 is enclosed by the protective member 23 and the second groove 2139.

Although this application has been described with reference to the preferred embodiments, various modifications may be made thereto and components thereof may be replaced with equivalents without departing from the scope of this application. Especially, as long as there is no structural conflict, the various technical features mentioned in each embodiment can be combined in any way. This application is not limited to the particular embodiments disclosed herein, but includes all technical solutions that fall within the scope of the claims.

What is claimed is:

1. A battery cell, comprising:
   a housing, comprising a first end wall; and
   at least one electrode terminal, disposed on the first end wall;
   the housing further comprising at least one of:
      a side wall disposed around the first end wall, a joint being formed between the side wall and the first end wall around the first end wall;
      a pressure relief mechanism disposed on the first end wall; and
      a sealed liquid injection hole disposed on the first end wall; and
   a protective member, covering an outer surface of the first end wall such that said at least one of:
      the joint around the first end wall;
      the pressure relief mechanism; and the sealed liquid injection hole;
   is completely covered by the protective member, wherein at least one first through hole is provided on the protective member, and the at least one first through hole is configured to expose the at least one electrode terminal, wherein
   a cavity configured to store liquid is formed between the protective member and the first end wall.

2. The battery cell according to claim 1, wherein the cavity is provided around the at least one electrode terminal.

3. The battery cell according to claim 1, wherein the battery cell further comprises at least one insulating member, and the at least one insulating member is disposed between the at least one electrode terminal and the first end wall; and
   a part of the protective member that surrounds the at least one first through hole and the first end wall or the insulating member are connected to form at least one first connection portion, the at least one first connection portion is disposed around the at least one electrode terminal, and the cavity is separated from the at least one first connection portion.

4. The battery cell according to claim 1, wherein at least one protrusion is formed on the outer surface of the first end wall, the protective member covers the at least one protrusion, and the cavity comprises a first sub-cavity located on a peripheral side of the at least one protrusion.

5. The battery cell according to claim 4, wherein the at least one protrusion is disposed around the at least one electrode terminal, the at least one protrusion has a first end surface facing away from inside of the housing, an inner peripheral surface facing the at least one electrode terminal, and an outer peripheral surface facing away from the at least one electrode terminal, and the protective member is attached to the first end surface; and
   the protective member is not attached to the inner peripheral surface, to form the first sub-cavity between the protective member and the inner peripheral surface; and/or the protective member is not attached to the outer peripheral surface, to form the first sub-cavity between the protective member and the outer peripheral surface.

6. The battery cell according to claim 5, wherein the first sub-cavity is provided around the at least one electrode terminal, and a cross section of the first sub-cavity is in a shape of a triangle.

7. The battery cell according to claim 4, wherein the at least one electrode terminal has a second end surface facing away from inside of the housing, and the at least one protrusion does not extend out of the second end surface along a thickness direction of the first end wall.

8. The battery cell according to claim 1, wherein the first end wall comprises a body and a protruding portion, the body is disposed around the protruding portion, the body comprises a first surface facing away from inside of the housing, the protruding portion protrudes from the first surface, the at least one electrode terminal is disposed on the protruding portion, and the cavity comprises a second sub-cavity located at a joint between the protruding portion and the body.

9. The battery cell according to claim 8, wherein the second sub-cavity is provided around the protruding portion.

10. The battery cell according to claim 8, wherein the protruding portion comprises a first wall portion and a second wall portion, the first wall portion is disposed parallel to the body, the second wall portion is disposed around the first wall portion, the second wall portion connects the first wall portion and the body, the at least one electrode terminal is disposed on the first wall portion, and the second sub-cavity is located at a joint between the second wall portion and the body.

11. The battery cell according to claim 1, wherein a first groove is provided on the outer surface of the first end wall, the at least one electrode terminal is disposed on a groove bottom wall of the first groove, the part of the protective member that surrounds the first through hole is connected to the groove bottom wall of the first groove, and the cavity comprises a third sub-cavity located at a joint between the groove bottom wall of the first groove and a groove side wall of the first groove.

12. The battery cell according to claim 11, wherein the third sub-cavity is provided around the at least one electrode terminal, and a cross section of the third sub-cavity is in a shape of a triangle.

13. The battery cell according to claim 1, wherein a second groove is provided on the outer surface of the first end wall, the protective member covers the second groove, and the cavity comprises a fourth sub-cavity enclosed by the second groove and the protective member.

14. The battery cell according to claim 1, wherein the housing further comprises a side wall, the side wall is disposed around the first end wall, and the protective member covers at least a part of an outer surface of the side wall.

15. The battery cell according to claim 14, wherein the first end wall and the side wall are connected to form a second connection portion, and the protective member covers the second connection portion.

16. The battery cell according to claim 15, wherein the housing further comprises a second end wall, the second end wall is disposed opposite to the first end wall, the side wall connects the first end wall and the second end wall, and the protective member covers at least a part of an outer surface of the second end wall.

17. The battery cell according to claim 16, wherein a part of the outer surface of the second end wall is not covered by the protective member.

18. A battery, comprising the battery cell according to claim 1.

19. A power consuming device, comprising the battery cell according to claim 1.

20. A battery cell, comprising:
a housing, comprising a first end wall;
an electrode terminal, disposed on the first end wall; and
a protective member, covering an outer surface of the first end wall, wherein a first through hole is provided on the protective member, and the first through hole is configured to expose the electrode terminal, wherein
a cavity configured to store liquid is formed between the protective member and the first end wall;
wherein the protective member is an insulating film; and
wherein the first end wall is not flat and comprises first surfaces relatively recessed with respect to second surfaces, wherein the film protective member contacts the second surfaces and not the first surfaces; said cavity being formed between the film protective member and the first surfaces.

* * * * *